(12) United States Patent
Kawasaki

(10) Patent No.: US 10,277,274 B2
(45) Date of Patent: Apr. 30, 2019

(54) RECEIVING CIRCUIT AND TRANSMITTING CIRCUIT, AND COMMUNICATION SYSTEM AND COMMUNICATION METHOD

(71) Applicant: SONY SEMICONDUCTOR SOLUTIONS CORPORATION, Kanagawa (JP)

(72) Inventor: Kenichi Kawasaki, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 34 days.

(21) Appl. No.: 14/902,073

(22) PCT Filed: Jun. 5, 2014

(86) PCT No.: PCT/JP2014/064939
§ 371 (c)(1),
(2) Date: Dec. 30, 2015

(87) PCT Pub. No.: WO2015/005032
PCT Pub. Date: Jan. 15, 2015

(65) Prior Publication Data
US 2016/0373164 A1 Dec. 22, 2016

(30) Foreign Application Priority Data
Jul. 9, 2013 (JP) .................. 2013-143330

(51) Int. Cl.
*H04B 3/52* (2006.01)
(52) U.S. Cl.
CPC ..................... *H04B 3/52* (2013.01)

(58) Field of Classification Search
CPC ...... G01R 31/11; G01R 31/021; G01R 27/28; H04B 3/52
See application file for complete search history.

(56) References Cited

U.S. PATENT DOCUMENTS 7,808,247 B1* 10/2010 Lo .................. G01R 31/021
324/533
8,134,495 B2* 3/2012 Ookawa ................. G01S 7/038
342/159
(Continued)

FOREIGN PATENT DOCUMENTS

| EP | 2199947 A1 | 6/2010 |
| JP | 2005-101892 A | 4/2005 |
| WO | WO 92/17866 | 10/1992 |

OTHER PUBLICATIONS

Extended European Search Report for European Patent Application No. 14823158.2 dated Jan. 23, 2017, 8 pages.
(Continued)

*Primary Examiner* — Sung S Ahn
(74) *Attorney, Agent, or Firm* — Sheridan Ross P.C.

(57) ABSTRACT

A receiving circuit according to the present disclosure includes a reference signal generation unit configured to generate a high-frequency reference signal, and transmit the reference signal to a transmitting circuit side through a signal transmission path configured to trap and transmit a radio wave in the transmission path, and a transmission data restoration unit configured to receive the reference signal modulated based on transmission data on the transmitting circuit side and returned through the signal transmission path, and restore the transmission data.

20 Claims, 12 Drawing Sheets

(56) References Cited

U.S. PATENT DOCUMENTS

| | | | | |
|---|---|---|---|---|
| 8,410,786 B1* | 4/2013 | Bradley | ............... | H04B 3/46 |
| | | | | 324/520 |
| 8,582,443 B1* | 11/2013 | Sun | ............... | H04L 43/16 |
| | | | | 370/242 |
| 2002/0118024 A1* | 8/2002 | Hill | ............... | G01R 27/32 |
| | | | | 324/642 |
| 2004/0251912 A1* | 12/2004 | Pharn | ............... | G01R 31/11 |
| | | | | 324/534 |
| 2005/0088336 A1* | 4/2005 | Sakamoto | ............... | G01S 7/038 |
| | | | | 342/175 |
| 2006/0007992 A1* | 1/2006 | Wang | ............... | H04B 3/46 |
| | | | | 375/224 |
| 2009/0008753 A1* | 1/2009 | Rofougaran | ...... | H04L 12/40013 |
| | | | | 257/660 |
| 2015/0288461 A1* | 10/2015 | Barabash | ............ | H04B 1/0458 |
| | | | | 455/115.1 |

OTHER PUBLICATIONS

International Search Report prepared by the Japanese Patent Office dated Jun. 19, 2014, for International Application No. PCT/JP2014/064939.

Pursula et al., "60-GHz Millimeter-Wave Identification Reader on 90-nm CMOS and LTCC," IEEE Transactions on Microwave Theory and Techniques, 2011, vol. 59, No. 4, pp. 1166-1173.

Pursula et al., "Millimeter-Wave Identification—A New Short-Range Radio System for Low-Power High Data-Rate Applications," IEEE Transactions on Microwave Theory and Techniques, 2008, vol. 56, No. 10, pp. 2221-2228.

Official Action (with English translation) for Chinese Patent Application No. 201480037600.3 dated Mar. 31, 2017, 18 pages.

* cited by examiner

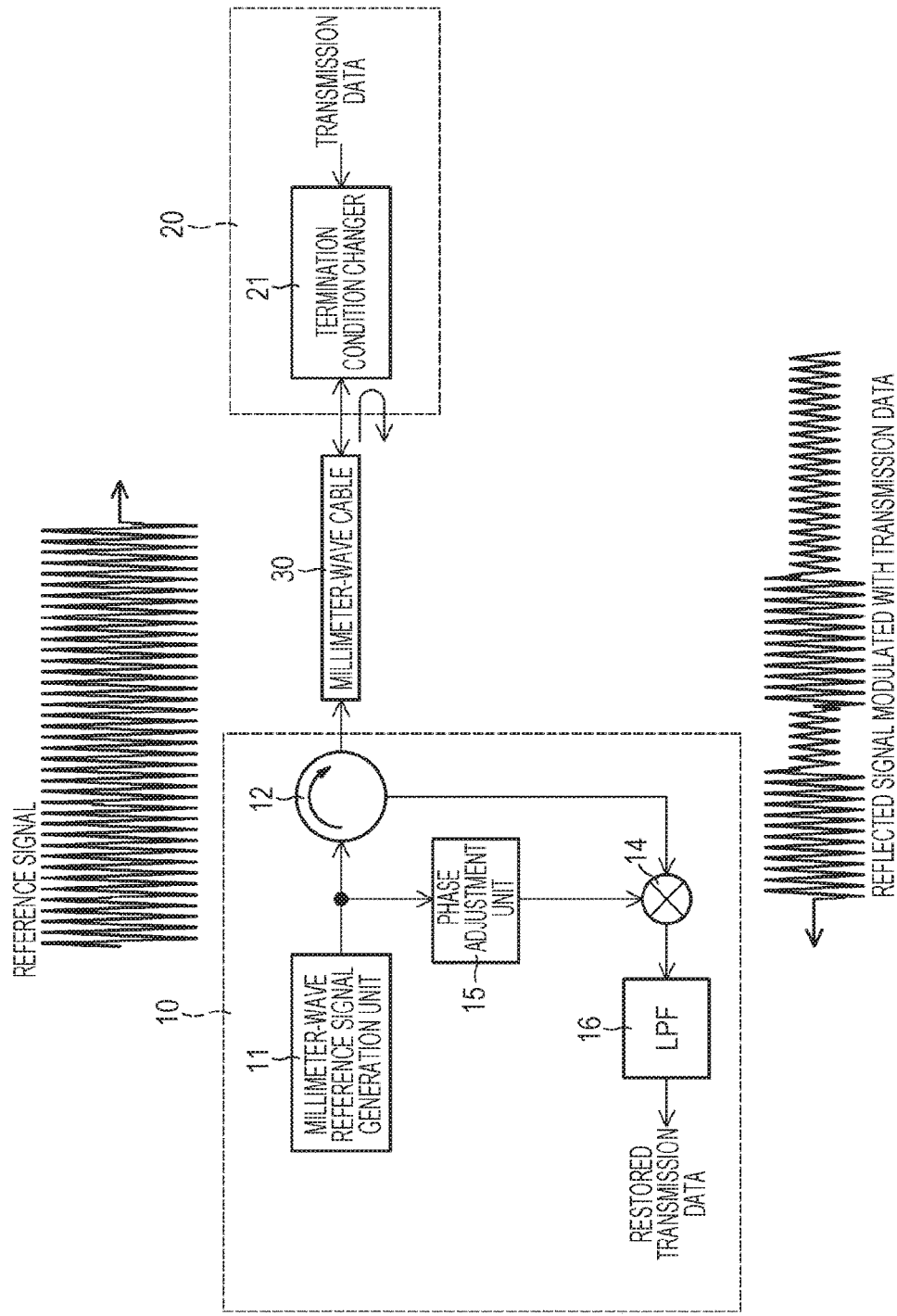

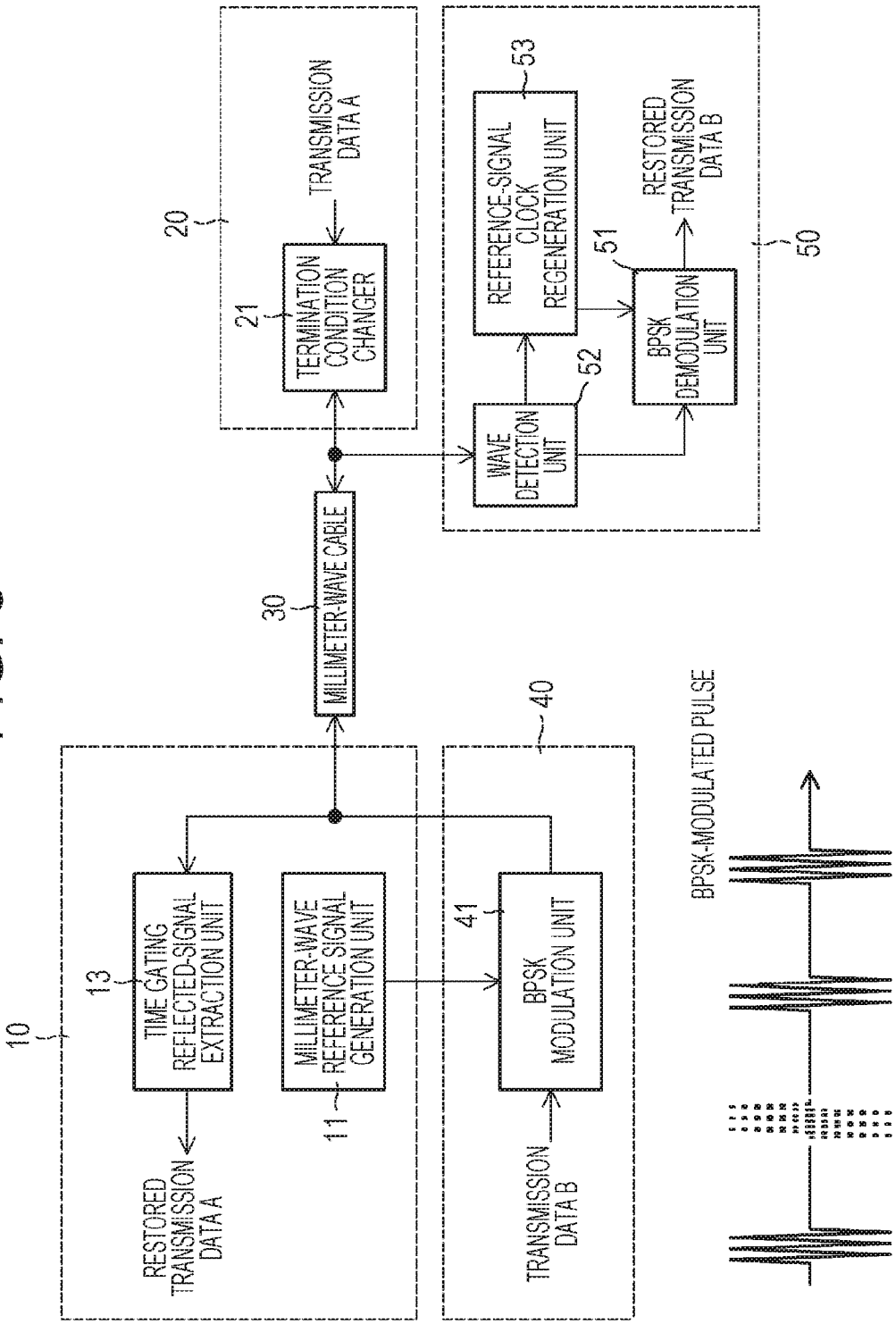

RECEIVING CIRCUIT AND TRANSMITTING CIRCUIT, AND COMMUNICATION SYSTEM AND COMMUNICATION METHOD

This application is a national stage application under 35 U.S.C. 371 and claims the benefit of PCT Application No. PCT/JP2014/064939 having an international filing date of Jun. 5, 2014, which designated the United States, which PCT application claimed the benefit of Japanese Priority Patent Application JP 2013-143330 filed Jul. 9, 2013, the disclosures of which are incorporated herein by reference in their entirety.

TECHNICAL FIELD

The present disclosure relates to a receiving circuit and a transmitting circuit, and a communication system and a communication method.

BACKGROUND ART

As a means of communication between various apparatuses such as electronic devices, information processors, semiconductor devices, or communication between circuit boards in one apparatus (device), a communication system is proposed for transmission of information modulated to a millimeter-wave band (e.g., see Non-Patent Documents 1 and 2).

CITATION LIST

Patent Documents

Non-Patent Document 1: P. Pursula, et. al, "Millimeter-Wave Identification-A New Short Radio System for Low-Power High Data-Rate Application, "IEEE TRANSACTIONS ON MICROWAVE THEORY AND TECHNIQUES, VOL. 56, NO. 10, October 2008

Non-Patent Document 2: P. Pursula, et. al, "60-GHz Millimeter-Wave Identification Reader on 90-nm CMOS and LTCC "IEEE TRANSACTIONS ON MICROWAVE THEORY AND TECHNIQUES, VOL. 59, NO. 4, April 2011

SUMMARY OF THE INVENTION

Problems to be Solved by the Invention

In Non-Patent Documents 1 and 2, each communication system represents transmission of a signal in a free space. Accordingly, a radio wave is scattered inefficiently, and interference with other communication unfortunately occurs. For prevention of interference with other communication, a frequency band to be used needs to be limited, and thus, a broadband signal cannot be used.

It is an object of the present disclosure to provide a receiving circuit and a transmitting circuit, and a communication system and a communication method which have excellent transmission efficiency, and are free from interference with other communication to use a broadband signal.

Solutions to Problems

In order to achieve the object, a receiving circuit according to the present disclosure includes
a reference signal generation unit configured to generate a high-frequency reference signal, and transmit the reference signal to a transmitting circuit through a signal transmission path configured to trap and transmit a radio wave in the transmission path, and
a transmission data restoration unit configured to receive the reference signal modulated based on transmission data in the transmitting circuit and returned through the signal transmission path, and restore the transmission data.

In order to achieve the object, a transmitting circuit according to the present disclosure includes
a modulation unit configured to modulate, based on transmission data, a high-frequency reference signal transmitted from a receiving circuit through a signal transmission path configured to trap and transmit a radio wave in the transmission path, and return the reference signal to the receiving circuit through the signal transmission path.

In order to achieve the object, a communication system according to the present disclosure includes
a transmitting circuit configured to transmit transmission data,
a receiving circuit configured to generate a high-frequency reference signal, and
a signal transmission path positioned between the transmitting circuit and the receiving circuit trapping and transmitting a radio wave in the transmission path,
the transmitting circuit modulating, based on the transmission data, the reference signal transmitted from the receiving circuit through the signal transmission path, and returning the reference signal to the receiving circuit through the signal transmission path, and
the receiving circuit receiving the reference signal returned from the transmitting circuit through the signal transmission path, and restoring the transmission data.

In order to achieve the object, a communication method according to the present disclosure includes
transmitting a high-frequency reference signal generated in a receiving circuit to a transmitting circuit, through a signal transmission path configured to trap and transmit a radio wave in the transmission path,
modulating, based on transmission data, the reference signal transmitted from the receiving circuit through the signal transmission path to return the reference signal to the receiving circuit through the signal transmission path, and
receiving the reference signal returned from the transmitting circuit through the signal transmission path to restore the transmission data.

Effects of the Invention

According to the present disclosure, communication is performed between the receiving circuit and the transmitting circuit through the signal transmission path configured to trap and transmit a radio wave in the transmission path, and thus, transmission efficiency is increased and a broadband signal can be used with no fear of interference with other communication.

It is noted that the effects described in the present specification are by way of example only and not limited to the description, and further may have additional effects.

BRIEF DESCRIPTION OF DRAWINGS

FIG. 5 is a block diagram illustrating an exemplary configuration of the receiving circuit and the transmitting circuit in the communication system according to Example 3.

FIG. 8 is a block diagram illustrating an exemplary configuration of the receiving circuit and the transmitting circuit in the communication system according to Example 6.

MODE FOR CARRYING OUT THE INVENTION

Figure 1A:
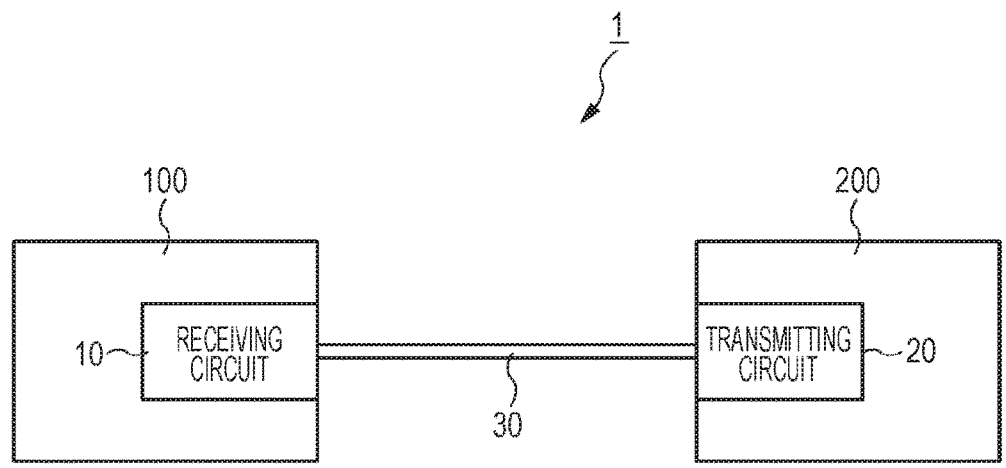
FIG. 1A is a block diagram illustrating an exemplary configuration of a communication system according to the technique of the present disclosure.

A mode (hereinafter, referred to as "embodiment") for carrying out a technique of the present disclosure will be described below using the drawings. The present disclosure is not limited to the embodiment, and various numerical values in the embodiment are provided as an example. In the following description, the same elements or elements having the same functions are denoted by the same reference signs, and repeated description will be omitted. The description will be given in the following order.

1. Overall Description of Receiving Circuit and Transmitting Circuit, and Communication System and Communication Method according to the Present Disclosure
2. Communication System according to technique of the Present Disclosure
3. Description of Embodiment of the Present Disclosure
 3-1. Example 1 (example of use of circulator)
 3-2. Example 2 (example of use of time gating)
 3-3. Example 3 (example of reference signal as continuous carrier wave)
 3-4. Example 4 (example of bidirectional transmission using one millimeter-wave cable)
 3-5. Example 5 (example of bidirectional communication using combination of BPSK transmission and transmission/reflection)
 3-6. Example 6 (example of combination of BPSK modulation of pulse with time gating)
 3-7. Verification of millimeter-wave transmission using millimeter-wave cable
 3-8. Specific example of termination condition changer <Overall Description of Receiving Circuit and Transmitting Circuit, and Communication System and Communication Method According to the Present Disclosure>

A communication system for transmission of an electromagnetic wave, in particular, a high-frequency signal such as a microwave, a millimeter wave, or a terahertz wave, through a signal transmission path is preferably used for, for example, signal transmission between various apparatuses, such as electronic devices, information processors, or semiconductor devices, or signal transmission between circuit boards in one apparatus (device). In the communication system, the signal transmission path transmits a high-frequency signal. The signal transmission path functions as a cable for connection between apparatuses or between circuit boards.

For example, the millimeter wave is a radio wave having a frequency of 30 [GHz] to 300 [GHz] (a wavelength of 1 [mm] to 10 [mm]), in a high frequency band. Information is modulated to a millimeter-wave band for signal transmission (communication), and thus high-speed transmission in the order of Gbps (e.g., not less than 5 [Gbps]) can be achieved. A signal required for high-speed signal transmission in the order of Gbps includes, for example, a data signal of a movie image or a computer image. Further, signal transmission in the millimeter-wave band has excellent interference resistance, and advantageously has no obstruction to other electrical wiring in cable connection between apparatuses.

In the communication system for transmission of a high-frequency signal, for example, a millimeter-wave band signal, the signal transmission path configured to trap and transmit a radio wave in the transmission path can have a configuration including a waveguide. In this configuration, the signal transmission path including the waveguide has a fixed length. The waveguide (waveguide cable) may be configured to include a hollow waveguide, a dielectric waveguide, or a dielectric waveguide filled with a dielectric material therein. However, the dielectric waveguide is preferably used which is excellent in flexibility than the hollow waveguide. In the dielectric waveguide, the electromagnetic wave propagates in the dielectric material while forming an electromagnetic field according to a wavelength (frequency) or the like. The waveguide includes a dielectric line or the like.

In the receiving circuit and the transmitting circuit, and the communication system and the communication method according to the present disclosure, the receiving circuit can be configured to have a signal separation unit configured to separate a reference signal returned from the transmitting circuit, from a reference signal transmitted to the transmitting circuit. In this configuration, the signal separation unit can be configured to temporally separate the reference signal transmitted to the transmitting circuit and the reference signal returned from the transmitting circuit.

In the receiving circuit and the transmitting circuit, and the communication system and the communication method according to the present disclosure, which include a preferable configuration described above, the reference signal generation unit can be configured to receive the reference signal returned from the transmitting circuit before transmitting the next reference signal. Alternatively, the reference signal generation unit can be configured to generate the reference signal at a periodic interval not overlapping the reference signal returned from the transmitting circuit. Further alternatively, the reference signal generation unit can be configured to transmit, to the transmitting circuit, the reference signal as a continuous signal (continuous carrier wave).

In the receiving circuit and the transmitting circuit, and the communication system and the communication method according to the present disclosure, which include the preferable configuration described above, the transmitting circuit can be configured so that a termination condition of the signal transmission path is changed based on the transmission data to modulate the reference signal.

<Communication System According to Technique of the Present Disclosure>

Figure 1B:
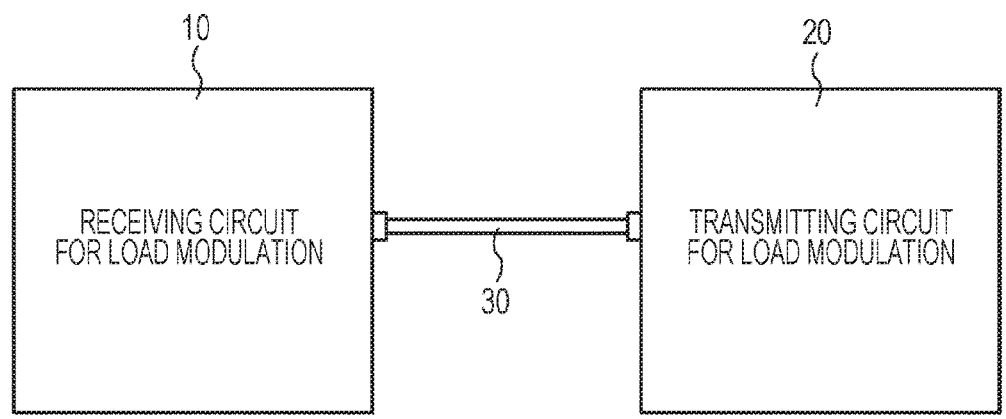
FIG. 1B is a block diagram illustrating an exemplary configuration of a receiving circuit and a transmitting circuit in the communication system.

An exemplary configuration of the communication system according to the technique of the present disclosure will be described using FIGS. 1A and 1B. FIG. 1A is a block diagram illustrating an exemplary configuration of the communication system according to the technique of the present disclosure, and FIG. 1B is a block diagram illustrating an exemplary configuration of the receiving circuit and the transmitting circuit in the communication system.

As illustrated in FIG. 1, the communication system 1 according to the present application example includes the receiving circuit (receiving unit/receiver) 10, the transmitting circuit (transmitting unit/transmitter) 20, and the signal transmission path 30 configured to transmit a high-frequency signal between the receiving circuit 10 and the transmitting circuit 20. In the present application example, the receiving circuit 10 is provided in a first communication device (electronic device) 100, and the transmitting circuit 20 is provided in a second communication device (electronic device) 200.

This configuration also represents that the signal transmission path 30 transmits the high-frequency signal between the first communication device 100 and the second communication device 200. In the communication devices 100 and 200 configured to transmit and receive a signal through the signal transmission path 30, the receiving circuit 10 and the transmitting circuit 20 are respectively disposed to be paired and combined. A signal transmission (communication) between the first communication device 100 and the second communication device 200 may employ a one-way (unidirectional) transmission, or may employ a bidirectional transmission.

The receiving circuit 10 and the transmitting circuit 20 (i.e., the first communication device 100 and the second communication device 200) are disposed within a predetermined range, and connected by the signal transmission path 30 having a length (fixed length) corresponding to the range. It is noted that since the high-frequency signal is a millimeter-wave signal, the "predetermined range" is preferably defined to restrict a range of millimeter wave transmission. A range having a distance smaller than a distance between communication devices used for broadcasting or general wireless communication, typically corresponds to the "predetermined range".

A mode of disposition of the receiving circuit 10 and the transmitting circuit 20 within the predetermined range includes a mode of disposition of the receiving circuit 10 and the transmitting circuit 20 respectively in separate communication devices (electronic devices), i.e., the first communication device 100 and the second communication device 200, as illustrated in FIG. 1A, and can further include modes as exemplified below. For example, in a mode, the receiving circuit 10 and the transmitting circuit 20 are considered to be disposed respectively on separate circuit boards in one electronic device. In this mode, one of the circuit boards corresponds to the first communication device 100, and the other circuit board corresponds to the second communication device 200.

In addition, in another mode, the receiving circuit 10 and the transmitting circuit 20 are considered to be disposed respectively in separate semiconductor chips in one electronic device. In this mode, one of the semiconductor chips corresponds to the first communication device 100, and the other semiconductor chip corresponds to the second communication device 200. Further, in still another mode, the receiving circuit 10 and the transmitting circuit 20 are considered to be disposed at separate circuit portions on the same circuit board. In this mode, one of the circuit portions corresponds to the first communication device 100, and the other circuit portion corresponds to the second communication device 200. However, disposition of the receiving circuit 10 and the transmitting circuit 20 is not limited to these modes.

Alternatively, the first communication device 100 and the second communication device 200 are considered to have combinations as described below, as an example. However, combinations described below are by way of example only, and are not limited to the followings.

The second communication device 200 being a battery-driven device, such as a mobile phone, a digital camera, a video camera, a game device, or a remote controller, is considered to be combined with the first communication device 100 being a battery charger thereof, or a device called a base station configured to perform image processing. Further, the second communication device 200 being a relatively thin device having the appearance of an IC card, is considered to be combined with the first communication device 100 being a card reader/writer thereof. The card reader/writer is used in combination with, for example, an electronic device body, such as a digital recorder/player, a terrestrial TV receiver, a mobile phone, a game device, or a computer. Further, when the combination is applied to an imaging apparatus, for example, the first communication device 100 is disposed on the main circuit board side and the second communication device 200 is disposed on the imaging board side, and signal transmission is performed in one apparatus (device).

A communication system for millimeter-wave communication will be described below as an example. The communication system uses, for example, a millimeter-wave band signal as the high-frequency signal, and transmits information modulated to a millimeter-wave band. The high-frequency signal being the millimeter-wave band signal has the following advantages.

a) The millimeter-wave communication has a wide communication band, and thus a data rate is readily increased.

b) A frequency used for transmission can be separated from another frequency for processing a baseband signal, and interference between the millimeter wave and the baseband signal is not likely to occur in frequency.

c) The millimeter-wave band has a short wavelength, and a waveguide structure defined according to a wavelength can be reduced. In addition, the millimeter-wave band has a larger attenuation with distance and a reduced diffraction, and thus electromagnetical shielding is facilitated.

d) In normal wireless communication, carrier wave stability is strictly regulated for prevention of interference or the like. In order to achieve a carrier wave having such high stability, external frequency standard component parts and a multiply circuit, a phase locked loop (PLL), or the like having high stability are used, and circuit size is increased. By contrast, the millimeter-wave communication can use, for transmission, a carrier wave having low stability and prevented from readily leaking outside, and an increase in circuit size can be inhibited.

In the millimeter-wave communication (transmission) for transmission of the information modulated to a millimeter-wave band, in order to achieve the transmitting circuit having a generation unit (oscillator) configured to generate, in a CMOS device, a millimeter-wave reference signal, the device needs to include a minute high-speed process operated in the millimeter wave band, and therefore, its cost is increased. However, for use with image signal transmission or the like, high-speed transmission is required for the image signal transmission in a forward direction, but in the reverse direction, transmission is required for a control signal or the like, and therefore, the transmission of a control signal or the like is fully achieved at low speed in many cases. In such a case, use of the millimeter wave in the reverse direction increases power consumption. In order to reduce the power consumption, another communication unit for low-speed transmission needs to be prepared.

The communication system 1 according to the present application example uses a load modulation technique to have a configuration without the generation unit (oscillator) configured to generate, on the transmitting circuit 20 side, the millimeter-wave reference signal. That is, as illustrated in FIG. 1B, in the communication system 1 according to the present application example, the load modulation technique is applied to the receiving circuit 10 and the transmitting circuit 20.

As described above, use of the load modulation technique eliminates the need for generation of the millimeter-wave reference signal in the transmitting circuit 20, and thus the transmitting circuit 20 for the millimeter-wave band can be achieved which has low power consumption and a simple configuration. Accordingly, the communication system having the transmitting circuit 20 can have reduced power consumption and a simplified system configuration. Further, a millimeter-wave CMOS process having a relatively low speed and low cost (preceding 0.13 um process) can achieve the transmitting circuit 20 for the millimeter-wave band. Further, a broadband pulse signal (i.e., millimeter-wave reference signal) can be used to achieve efficient reflected-wave communication.

DESCRIPTION OF EMBODIMENT OF THE PRESENT DISCLOSURE

The communication system according to an embodiment of the present disclosure includes the transmitting circuit configured to transmit the transmission data, the receiving circuit configured to receive the transmission data from the transmitting circuit, and the signal transmission path configured to perform signal transmission between the transmitting circuit and the receiving circuit. In this configuration, the receiving circuit corresponds to the receiving circuit 10 for load modulation of FIG. 1B, also represents the receiving circuit according to an embodiment of the present disclosure, and generates the millimeter-wave reference signal. The transmitting circuit corresponds to the transmitting circuit 20 for load modulation of FIG. 1B, and also represents the transmitting circuit according to an embodiment of the present disclosure. Further, the present communication system achieves the communication method according to an embodiment of the present disclosure.

In the communication system, the signal transmission path includes the waveguide, and traps and transmits the radio wave (millimeter wave) in the transmission path (in the waveguide). The signal transmission path transmits the millimeter wave. Since the signal transmission path functions as a cable for connecting the receiving circuit 10 and the transmitting circuit 20, the signal transmission path may be also referred to as a millimeter-wave cable 30.

The transmitting circuit 20 modulates the millimeter-wave reference signal transmitted from the receiving circuit 10 through the millimeter-wave cable 30, based on the transmission data, and returns the reference signal to the receiving circuit 10 through the millimeter-wave cable 30. The receiving circuit 10 transmits the millimeter-wave reference signal to the transmitting circuit 20 through the millimeter-wave cable 30, receives the millimeter-wave reference signal (modulated signal/reflected signal) returned from the transmitting circuit 20 through the millimeter-wave cable 30, and restores the transmission data.

As described above, in the present embodiment, the communication system 1 has the receiving circuit 10 and the transmitting circuit 20 to which the load modulation technique is applied. The communication system 1 uses the millimeter-wave cable 30 configured to trap and transmit the radio wave in the transmission path, as the signal transmission path (propagation path) between the receiving circuit 10 and the transmitting circuit 20. Therefore, transmission efficiency can be increased and a transmission distance can be set longer, compared with the signal transmission in the free space. Further, since the radio wave is trapped in the transmission path, the broadband signal can be used with no fear of interference with other communication. Accordingly, a pulse width of the reference signal can be reduced for high-speed transmission of the signal, and the reference signal transmitted to the transmitting circuit 20 and the reference signal (reflected signal) returned from the transmitting circuit 20 can be readily separated from each other.

Further, unlike the signal transmission in the free space, the signal transmission performed using the millimeter-wave cable 30 having a fixed length (a predetermined length) stabilizes arrival timing of the reference signal (reflected signal) returned from the transmitting circuit 20, and signal separation described above is facilitated. Further, a technique such as pulse integration is also readily used advantageously. More specifically, when one pulse wave is insufficient in terms of SN ratio, since a delay of propagation in the millimeter-wave cable 30 is substantially temporally constant, a plurality of pulse signals (i.e., millimeter-wave reference signals) can be integrated to improve the SN ratio.

A specific example of the receiving circuit 10 and the transmitting circuit 20 which achieve the technique according to the present embodiment will be described below.

Example 1

Figure 2:
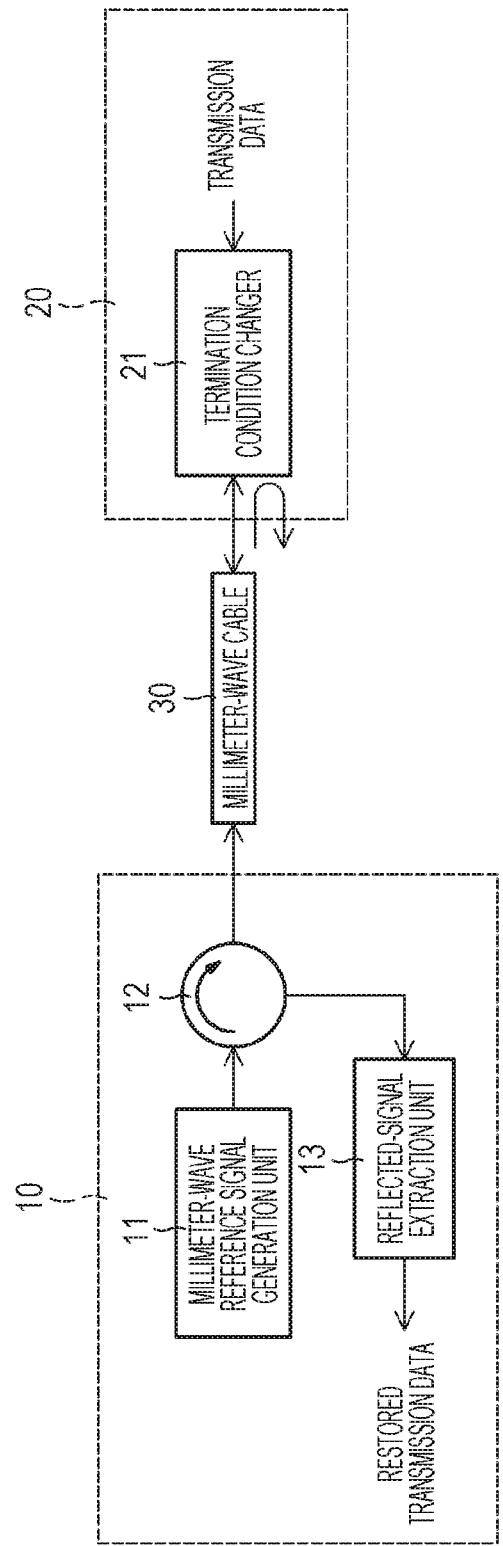
FIG. 2 is a block diagram illustrating an exemplary configuration of the receiving circuit and the transmitting circuit in the communication system according to Example 1.

FIG. 2 is a block diagram illustrating an exemplary configuration of the receiving circuit and the transmitting circuit in the communication system according to Example 1.

As illustrated in FIG. 2, the receiving circuit 10 includes a millimeter-wave reference signal generation unit 11, the signal separation unit 12, and a reflected-signal extraction unit 13. The millimeter-wave reference signal generation unit 11 is an oscillator configured to generate the millimeter-wave reference signal. The signal separation unit 12 includes a circulator, or the like, and separates the millimeter-wave reference signal (modulated signal/reflected signal/reflected wave) returned from the transmitting circuit 20, from the millimeter-wave reference signal transmitted to the transmitting circuit 20. The reflected-signal extraction unit 13 is an example of a transmission data restoration unit configured to restore data transmitted from the transmitting circuit 20, and extracts the reference signal, i.e., the reflected signal, separated in the signal separation unit 12, to restore the transmission data transmitted by the transmitting circuit 20.

The transmitting circuit 20 includes a termination condition changer 21. The termination condition changer 21 is an example of a modulation unit configured to modulate, based on the transmission data, the millimeter-wave reference signal transmitted from the receiving circuit 10 through the millimeter-wave cable 30. Specifically, the termination condition changer 21 changes, based on the transmission data, the termination condition of the millimeter-wave cable 30 to modulate the millimeter-wave reference signal to the carrier wave (carrier). The termination condition changer 21 maps the information to be transmitted to the termination condition to transmit data to the receiving circuit 10 through the millimeter-wave cable 30.

As an example, the termination condition of the millimeter-wave cable 30 includes a reflection condition or a terminator. When the termination condition employs the reflection condition, the termination condition changer 21 changes a reflection coefficient of termination of the millimeter-wave cable 30 to, for example, large/small according to a logic level (logic "1"/logic "0") of the transmission data, to modulate the millimeter-wave reference signal. More specifically, the termination of the millimeter-wave cable 30 can be switched to, for example, a closure (SHORT)/opening (OPEN) condition to modulate the reference signal.

When the termination condition employs the terminator, the termination condition changer 21 changes a resistance value of the terminator of the millimeter-wave cable 30 according to the logic level of the transmission data, to modulate the millimeter-wave reference signal. Alternatively, the termination condition changer 21 may be configured, for example, to change a phase of the reflected signal (modulated signal), according to the logic level of the transmission data. A specific example of the termination condition changer 21 will be described in detail below.

The communication system according to Example 1 having the configuration described above uses the load modulation technique using the millimeter-wave cable 30 for the signal transmission path (propagation path). The millimeter-wave reference signal being the modulated signal returned from the transmitting circuit 20 through the millimeter-wave cable 30, i.e., the reflected signal (reflected wave), is configured to be separated, by the signal separation unit 12 such as a circulator, from the millimeter-wave reference signal transmitted.

As described above, the millimeter-wave cable 30 configured to trap and transmit the radio wave in the transmission path is used as the signal transmission path, and thus, the transmission efficiency can be increased and the transmission distance can be set longer, compared with the signal transmission in the free space. Further, since the broadband signal can be used with no fear of interference with other communication, the pulse width of the reference signal can be reduced. Accordingly, the high-speed transmission of the signal can be achieved, and the reference signal transmitted to the transmitting circuit 20, and the modulated signal (reflected signal) transmitted from the transmitting circuit 20 are readily separated from each other.

Example 2

Figure 3:
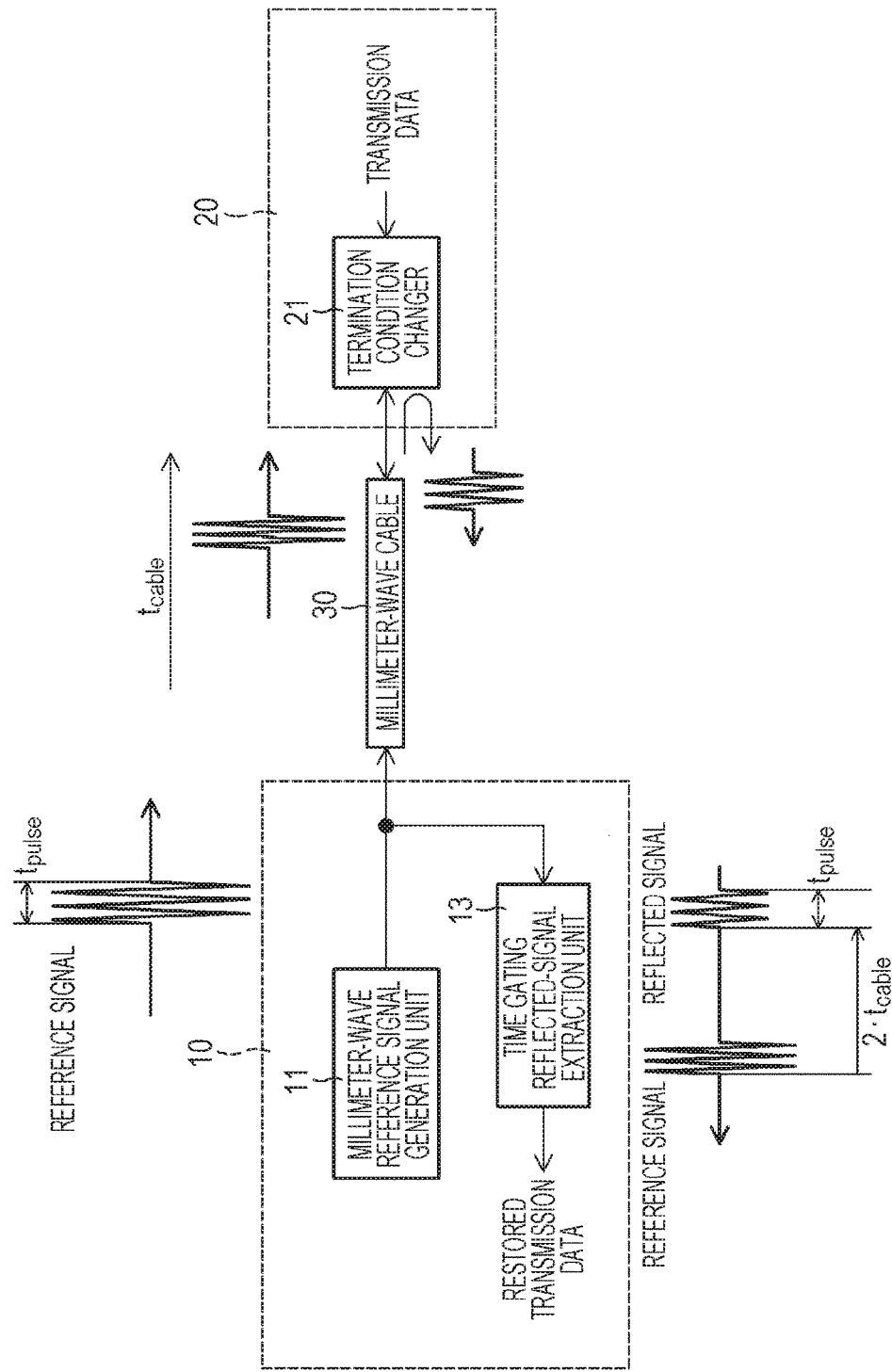
FIG. 3 is a block diagram illustrating an exemplary configuration of the receiving circuit and the transmitting circuit in the communication system according to Example 2.

FIG. 3 is a block diagram illustrating an exemplary configuration of the receiving circuit and the transmitting circuit in the communication system according to Example 2.

In Example 1, the signal separation unit 12, such as a circulator, is used to separate the modulated signal (reflected signal) transmitted from the transmitting circuit 20, from the reference signal transmitted to the transmitting circuit 20. In Example 2, by contrast, a time gating technique is used to temporally separate the reference signal transmitted and the reflected signal from each other.

In the millimeter-wave cable 30, the broadband signal can be transmitted. Accordingly, as the reference signal transmitted to the transmitting circuit 20, the broadband pulse signal having a narrow pulse width can be used. This means that it is easy to temporally separate the reflected signal from the transmitting circuit 20. Therefore, in Example 2, the time gating technique is applied so that the reflected-signal extraction unit 13 functions as the signal separation unit 12 of Example 1.

Duration of the millimeter-wave reference signal generated and transmitted to the transmitting circuit 20 by the millimeter-wave reference signal generation unit 11 is denoted by $t_{pulse}$, and a one-way propagation time in a millimeter-wave cable 30 is denoted by $t_{cable}$. The millimeter-wave cable 30 has a constant length (fixed length), and the propagation time $t_{cable}$ is determined depending on the length. After $2 \cdot t_{cable}$ from the transmission of the reference signal having a duration $t_{pulse}$, the reflected signal is returned from the transmitting circuit 20. Accordingly, in the reflected-signal extraction unit 13, the modulated signal (reflected wave) is extracted which is returned after $2 \cdot t_{cable}$ from the transmission of the millimeter-wave reference signal to the transmitting circuit 20 by the time gating.

According to the communication system of Example 2 having the configuration described above, a function and an effect as similar to the communication system of Example 1 can be obtained, and the use of a signal separation technique based on the time gating can advantageously eliminate the signal separation unit 12 such as the circulator from the receiving circuit 10.

In the extraction of the reflected wave based on the time gating described above, as an example of transmission of the millimeter-wave reference signal output from the millimeter-wave reference signal generation unit 11, the following two Transmission examples #1 and #2 will be described. These Transmission examples #1 and #2 will be described in detail using timing waveform charts of FIGS. 4A and 4B. In any of Transmission examples #1 and #2, timing control is performed in the millimeter-wave reference signal generation unit 11.

Transmission Example #1

Figure 4A:
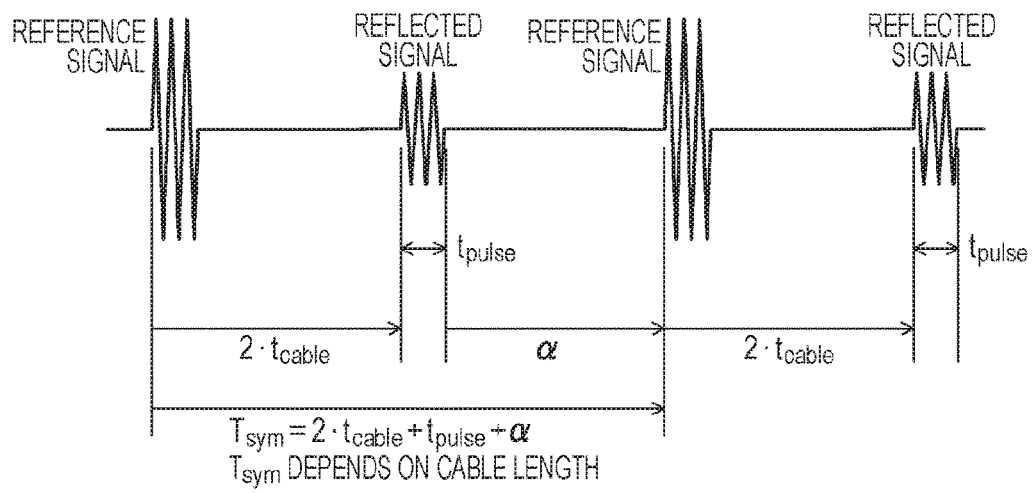
FIG. 4A is a timing waveform chart illustrating Transmission example #1 of a millimeter-wave reference signal.

In Transmission example #1, after the reference signal (reflected signal) returned from the transmitting circuit 20, the next reference signal is transmitted. Specifically, as illustrated in FIG. 4A, after $2 \cdot t_{cable}$ from the transmission of the millimeter-wave reference signal, the reflected signal having a pulse width (duration) $t_{pulse}$ is returned and received, and then, after a predetermined time a, the next reference signal is transmitted. In this configuration, the periodic interval $T_{sym}$ between the millimeter-wave reference signals is expressed as: $T_{sym}=2 \cdot t_{cable}+t_{pulse}+\alpha$.

As described above, although Transmission example #1 represents a simple transmission example, the propagation time $t_{cable}$ of the millimeter-wave cable 30 has a strong influence on the periodic interval $T_{sym}$ between the reference signals, and the periodic interval is increased. In other words, in Transmission example #1, the periodic interval $T_{sym}$ between the reference signals depends on the length of the millimeter-wave cable 30.

Transmission Example #2

Figure 4B:
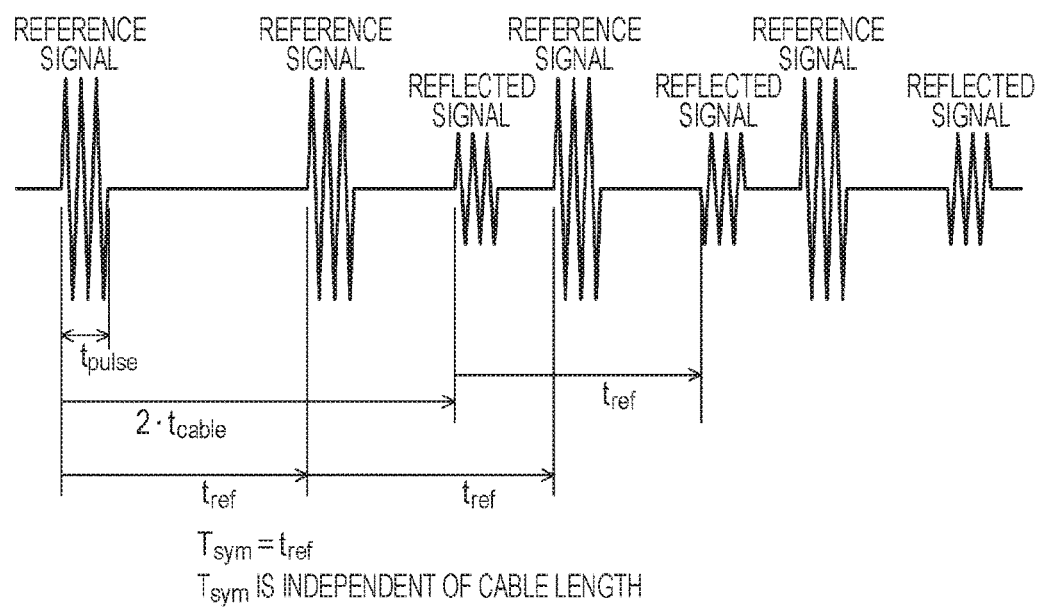
FIG. 4B is a timing waveform chart illustrating Transmission example #2 of the millimeter-wave reference signal

In Transmission example #2, the reference signal is transmitted at a periodic interval not overlapping the reference signal (reflected signal) returned from the transmitting circuit 20. Specifically, the periodic interval $T_{sym}$ between the reference signals is defined to be independent of the length of the millimeter-wave cable 30, that is, to have a constant periodic interval $T_{ref}$ independent of the length of the millimeter-wave cable 30. As illustrated in FIG. 4B, a time of the periodic interval $T_{ref}$ is set or timing and a phase of the reflected signal are set so that the reference signal and the reflected signal do not overlap each other.

As described above, in Transmission example #2 in which the reference signal is transmitted at a periodic interval $T_{sym}$ (=$T_{ref}$) not overlapping the reflected signal, the periodic interval $T_{sym}$ is independent of the length of the millimeter-wave cable 30. Accordingly, the periodic interval $T_{sym}$ between the reference signals can be set shorter than that in Transmission example #1.

Example 3

FIG. 5 is a block diagram illustrating an exemplary configuration of the receiving circuit and the transmitting circuit in the communication system according to Example 3.

In Examples 1 and 2, the millimeter-wave reference signals are transmitted, as intermittent (periodic) signals, to the transmitting circuit 20. In contrast, in Example 3, the millimeter-wave reference signals are transmitted, as the continuous signal, i.e., the continuous carrier wave, to the transmitting circuit 20. That is, the millimeter-wave reference signal generation unit 11 continuously generates the millimeter-wave reference signals, and transmits, as the continuous carrier wave, the signals to the transmitting circuit 20 through the millimeter-wave cable 30.

For adoption of reflection/transmission using the reference signals as the continuous carrier wave, in the communication system according to Example 3, the receiving circuit 10 includes a multiplier 14, a phase adjustment unit 15, and a low-pass filter (LPF) 16, in addition to the millimeter-wave reference signal generation unit 11 and the signal separation unit 12.

One input of the multiplier 14 is the reflected signal from the transmitting circuit 20 which is separated from the reference signal transmitted to the transmitting circuit 20 in the signal separation unit 12. The other input of the multiplier 14 is the reference signal generated in the millimeter-wave reference signal generation unit 11 and phase-adjusted in the phase adjustment unit 15. The phase adjustment unit 15 adjusts a phase of the reference signal generated in the millimeter-wave reference signal generation unit 11 to match a phase of the reflected signal from the transmitting circuit 20.

In this configuration, the reflected signal (modulated signal) from the transmitting circuit 20 is an amplitude-modulated wave. Accordingly, in the multiplier 14, the reflected signal from the transmitting circuit 20 and the reference signal phase-adjusted in the phase adjustment unit 15 are multiplied together, and detection is performed for extraction of an original signal from the modulated signal. From a multiplication result of the multiplier 14, a broadband component is removed by the LPF 16, and restored transmission data is obtained.

According to the communication system of Example 3 having the configuration described above, the reflection/transmission uses the reference signals as the continuous carrier wave, so that the reflection/transmission can be combined with transmission such as binary phase shift keying (BPSK) or amplitude shift keying (ASK) and extension to the bidirectional transmission (communication) is made possible.

Example 4

Figure 6:
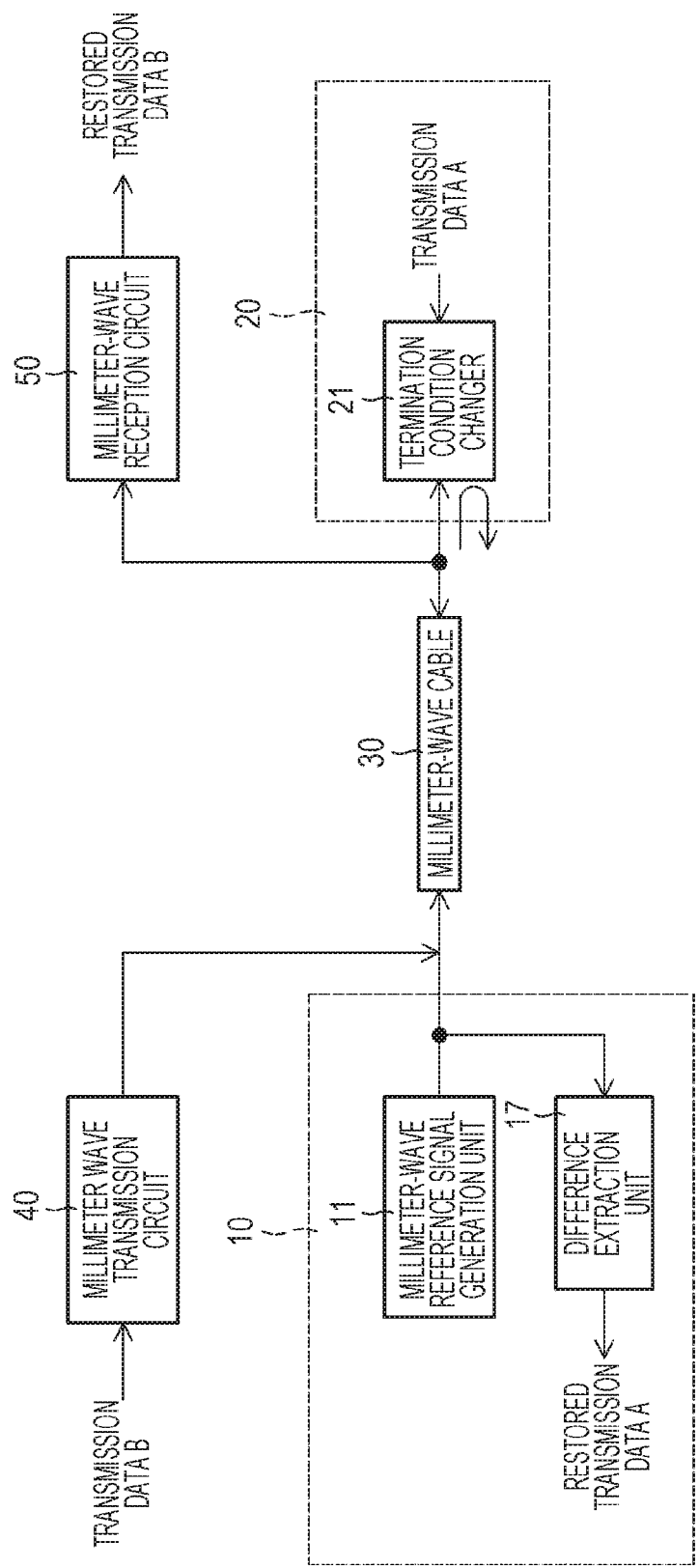
FIG. 6 is a block diagram illustrating an exemplary configuration of the receiving circuit and the transmitting circuit in the communication system according to Example 4.

Example 4 is an expanded example of Example 3 using the reference signals as the continuous carrier wave. FIG. 6 illustrates an exemplary configuration of the receiving circuit and the transmitting circuit in the communication system according to Example 4.

In the communication system according to Example 4, bidirectional millimeter-wave transmission is performed using one millimeter-wave cable 30. Specifically, as illustrated in FIG. 6, the receiving circuit 10 configured to receive transmission data A includes a transmitting circuit 40 configured to transmit transmission data B, and the transmitting circuit 20 configured to transmit the transmission data A includes a receiving circuit 50 configured to receive the transmission data B.

As the expanded example of Example 3, the millimeter-wave reference signal generation unit 11 according to Example 4 continuously generates the millimeter-wave reference signals, and transmits the millimeter-wave reference signals, as the continuous carrier wave, to the transmitting circuit 20 through the millimeter-wave cable 30. In the communication system according to Example 4, the receiving circuit 10 includes a difference extraction unit 17 in addition to the millimeter-wave reference signal generation unit 11. The receiving circuit 10 compares the reflected signal returned from the transmitting circuit 20 through the millimeter-wave cable 30, with the reference signal generated in the millimeter-wave reference signal generation unit 11, and restores the transmission data A based on the difference between the signals.

The transmission/reflection includes the receiving circuit 10 and the transmitting circuit 20 having the configurations described above, and uses the reference signals as the continuous carrier wave. The transmission/reflection can use the transmitting circuit 40 and the receiving circuit 50, in combination with transmission such as BPSK or ASK. Use of a combination of the transmission/reflection using the reference signals as the continuous carrier wave, and the transmission such as BPSK or ASK can achieve the bidirectional millimeter-wave transmission (communication) using the one millimeter-wave cable 30.

Example 5

Example 5 is another expanded example of Example 3 using the reference signals as the continuous carrier wave.

Figure 7:
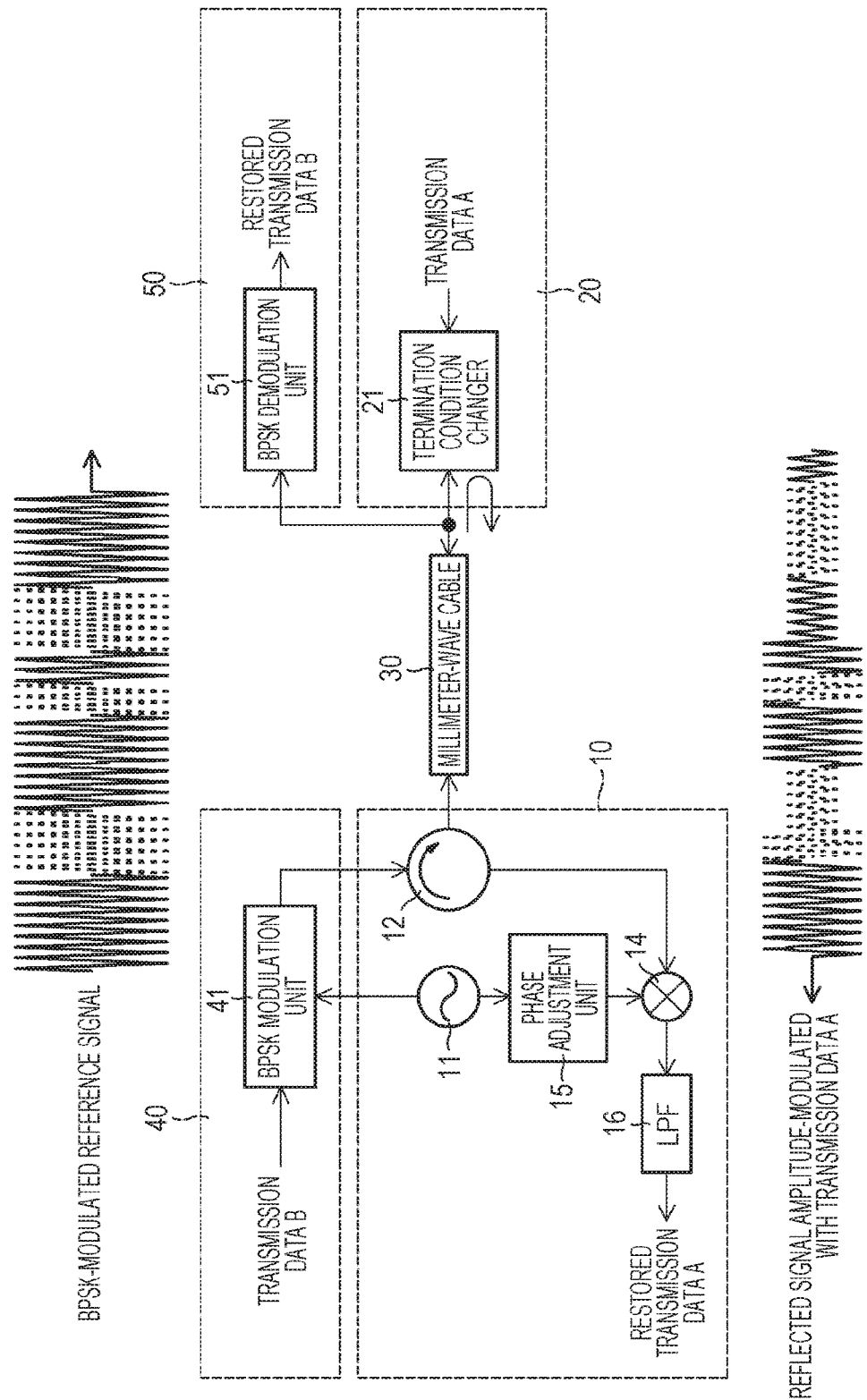
FIG. 7 is a block diagram illustrating an exemplary configuration of the receiving circuit and the transmitting circuit in the communication system according to Example 5.

FIG. 7 illustrates an exemplary configuration of the receiving circuit and the transmitting circuit in the communication system according to Example 5.

In the communication system according to Example 5, similar to the communication system according to Example 4, the receiving circuit 10 configured to receive transmission data A includes the transmitting circuit 40 configured to transmit transmission data B, and the transmitting circuit 20 configured to transmit the transmission data A includes the receiving circuit 50 configured to receive the transmission data B. The bidirectional millimeter-wave transmission is performed using one millimeter-wave cable 30.

Further, in the communication system according to Example 5, reflection transmission using the reference signals as the continuous carrier wave, and BPSK transmission are combined to achieve the bidirectional millimeter-wave transmission (communication) using the one millimeter-wave cable 30. Specifically, the transmitting circuit 40 configured to transmit the transmission data B includes a BPSK modulation unit 41, and the receiving circuit 50 configured to receive the transmission data B includes a BPSK demodulation unit 51. The BPSK modulation unit 41 or the BPSK demodulation unit 51 may use a known circuit configuration.

Further, in the communication system according to Example 5, similarly to the configuration of Example 3, the receiving circuit 10 is configured to include the multiplier 14, the phase adjustment unit 15, and the LPF 16, i.e., an ASK demodulation circuit, in addition to the millimeter-wave reference signal generation unit 11 and the signal separation unit 12.

In the communication system according to Example 5 having the configuration described above, the BPSK modulation unit 41 BPSK-modulates, based on the transmission data B, the millimeter-wave reference signal generated in the millimeter-wave reference signal generation unit 11. FIG. 7 illustrates the BPSK-modulated reference signals indicated by a solid line waveform and a dotted line waveform. The BPSK-modulated reference signal is transmitted to the transmitting circuit 20 by the millimeter-wave cable 30, after passing the signal separation unit 12 such as the circulator.

The BPSK-modulated reference signal transmitted by the millimeter-wave cable 30 is supplied to the BPSK demodulation unit 51, and BPSK-demodulated. Therefore, the transmission data B transmitted from the receiving circuit 10 is restored. Further, in the transmitting circuit 20, the termination condition changer 21 changes the termination condition of the millimeter-wave cable 30 based on the transmission data A to perform amplitude modulation on the BPSK-modulated reference signal, based on the transmission data A.

The BPSK-modulated reference signal which is amplitude-modulated with the transmission data A is returned, as the reflected signal (modulated signal), to the receiving circuit 10 through the millimeter-wave cable 30. The reflected signal amplitude-modulated with the transmission data A is separated by the signal separation unit 12 from the reference signal BPSK-modulated in the BPSK modulation unit 41, and the reflected signal is supplied to the multiplier 14. In the multiplier 14, the reflected signal from the transmitting circuit 20 and the reference signal phase-adjusted in the phase adjustment unit 15 are multiplied together, and detection is performed for extraction of the original signal from the reflected signal as the modulated signal. From a multiplication result of the multiplier 14, the broadband component is removed by the LPF 16, and restored transmission data A is obtained.

As described above, combination of the BPSK transmission and the transmission/reflection using the reference signals as the continuous carrier wave can also perform the bidirectional millimeter-wave transmission (communication), using one millimeter-wave cable 30. In the present example, the BPSK transmission is combined with the transmission/reflection using the reference signals as the continuous carrier wave, but another transmission such as ASK transmission may be combined with the transmission/reflection.

Example 6

FIG. 8 is a block diagram illustrating an exemplary configuration of the receiving circuit and the transmitting circuit in the communication system according to Example 6.

In the communication system according to Example 6, periodic (intermittent) pulse signals are used as the millimeter-wave reference signal, the BPSK modulation of the pulse signals is combined with the time gating used in Example 2 and the bidirectional millimeter-wave transmission (bidirectional communication) is performed using one millimeter-wave cable 30.

Specifically, the receiving circuit 10 includes, similarly to Example 2, the millimeter-wave reference signal generation unit 11 and the reflected-signal extraction unit 13, and has a configuration in which the time gating technique is applied to the reflected-signal extraction unit 13. The transmitting circuit 40 provided on the receiving circuit 10 side includes the BPSK modulation unit 41, and in the BPSK modulation unit 41, the periodic pulse signals (millimeter-wave reference signal) generated in the millimeter-wave reference signal generation unit 11 is BPSK-modulated based on the transmission data B.

The receiving circuit 50 provided on the transmitting circuit 20 side includes a wave detection unit 52 and a reference-signal clock regeneration unit 53, in addition to the BPSK demodulation unit 51. The wave detection unit 52 detects the pulse signals BPSK-modulated in the BPSK modulation unit 41 and transmitted through the millimeter-wave cable 30, and supplies the detected output to the BPSK demodulation unit 51 and the reference-signal clock regeneration unit 53. The reference-signal clock regeneration unit 53 regenerates a clock based on the detected output of the wave detection unit 52, i.e., the periodic pulse signals, and supplies the clock to the BPSK demodulation unit 51.

In the communication system according to Example 6 having the configuration described above, the BPSK modulation unit 41 BPSK-modulates, based on the transmission data B, the millimeter-wave reference signal intermittently generated in the millimeter-wave reference signal generation unit 11, i.e., the periodic pulse signals. FIG. 8 illustrates the BPSK-modulated reference signals indicated by a solid line waveform and a dotted line waveform. The BPSK-modulated pulse signals are transmitted to the transmitting circuit 20 by the millimeter-wave cable 30.

The BPSK-modulated pulse signals transmitted by the millimeter-wave cable 30 are supplied to the transmitting circuit 20, and BPSK-demodulated in the BPSK demodulation unit 51. Therefore, the transmission data B transmitted from the receiving circuit 10 is restored. Further, in the transmitting circuit 20, the termination condition changer 21 changes the termination condition of the millimeter-wave cable 30 based on the transmission data A to perform amplitude modulation on the BPSK-modulated pulse signals, based on the transmission data A.

The BPSK-modulated pulse signals which are amplitude-modulated with the transmission data A are returned, as the reflected signals (modulated signals), to the receiving circuit 10 through the millimeter-wave cable 30. The reflected signals amplitude-modulated with the transmission data A are extracted by the time gating in the reflected-signal extraction unit 13, and the restored transmission data A is obtained.

As described above, combination of the time gating with the BPSK modulation using the periodic pulse signals as the reference signal can also perform the bidirectional millimeter-wave transmission (bidirectional communication), using one millimeter-wave cable 30.

[Verification of Principle of Millimeter-Wave Cable]

Figure 9A:
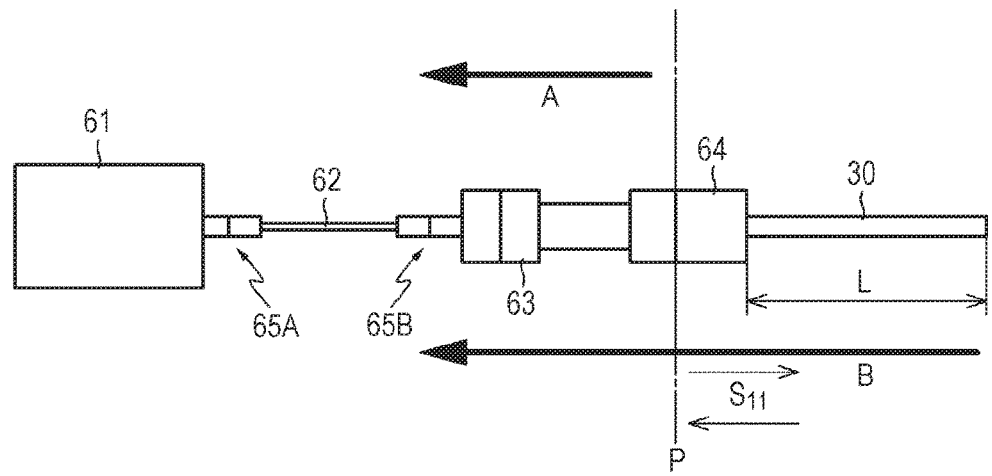
FIG. 9A is a configuration diagram illustrating a schematic configuration of a system used for verification of millimeter wave transmission using a millimeter-wave cable.

Next, the millimeter wave transmission using the millimeter-wave cable 30 used in Examples 1 to 6 will be verified. FIG. 9A illustrates a schematic configuration of a system used for verification of the millimeter wave transmission using the millimeter-wave cable 30.

Figure 9B:
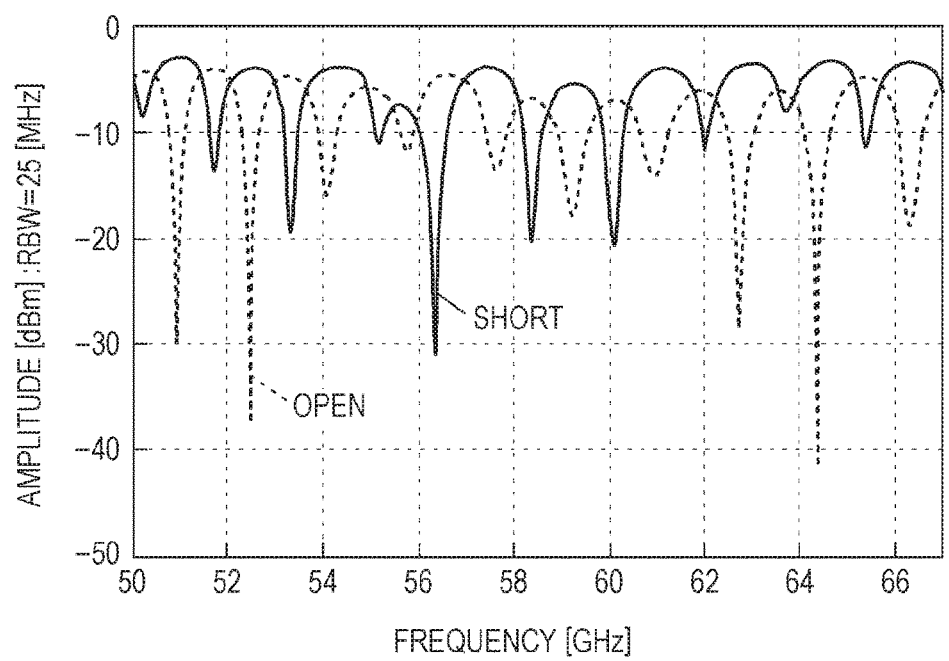
FIG. 9B is a graph illustrating a frequency-amplitude characteristic upon switching a termination condition of the millimeter-wave cable to, for example, SHORT/OPEN.

For example, the dielectric waveguide having a fixed length L is described as an example, which is used as the millimeter-wave cable 30 used for verification of the millimeter wave transmission, and changes the termination condition of the millimeter-wave cable 30 to switch the termination of the millimeter-wave cable 30 for example to the closure (SHORT)/opening (OPEN) condition. FIG. 9B illustrates a frequency-amplitude characteristic upon switching the termination condition of the millimeter-wave cable 30 to, for example, SHORT/OPEN. In this case, RBW (resolution bandwidth)=25 [MHz].

As illustrated in FIG. 9A, for the verification of the millimeter wave transmission, a signal generation/measurement device 61 is used which generates a millimeter-wave signal, and measures the reflected signal (reflected wave) reflected and returned from the termination of the millimeter-wave cable 30. The millimeter-wave signal generated in the signal generation/measurement device 61 is supplied to the millimeter-wave cable 30 through a coaxial cable 62, a coaxial waveguide 63, and a waveguide adapter 64. The coaxial cable 62 has one end connected to an input-output terminal of the signal generation/measurement device 61 through a connector (male/female) 65A, and the other end connected to the coaxial waveguide 63 through a connector (male/female) 65B.

An interface (connection plane) between the coaxial waveguide 63 and the waveguide adapter 64 is defined as a reflection plane P due to impedance mismatching. Accordingly, the millimeter-wave signal supplied from the signal generation/measurement device 61 to the coaxial waveguide 63 through the coaxial cable 62 is reflected on the reflection plane P, and returned, as an A component of the reflected wave, to the signal generation/measurement device 61 through the coaxial waveguide 63 and the coaxial cable 62. Further, the millimeter-wave signal passing through the reflection plane P is reflected at the termination of the millimeter-wave cable 30, and returned, as a B component of the reflected wave, to the signal generation/measurement device 61 through the millimeter-wave cable 30, the waveguide adapter 64, the coaxial waveguide 63, and the coaxial cable 62.

Figure 10A:
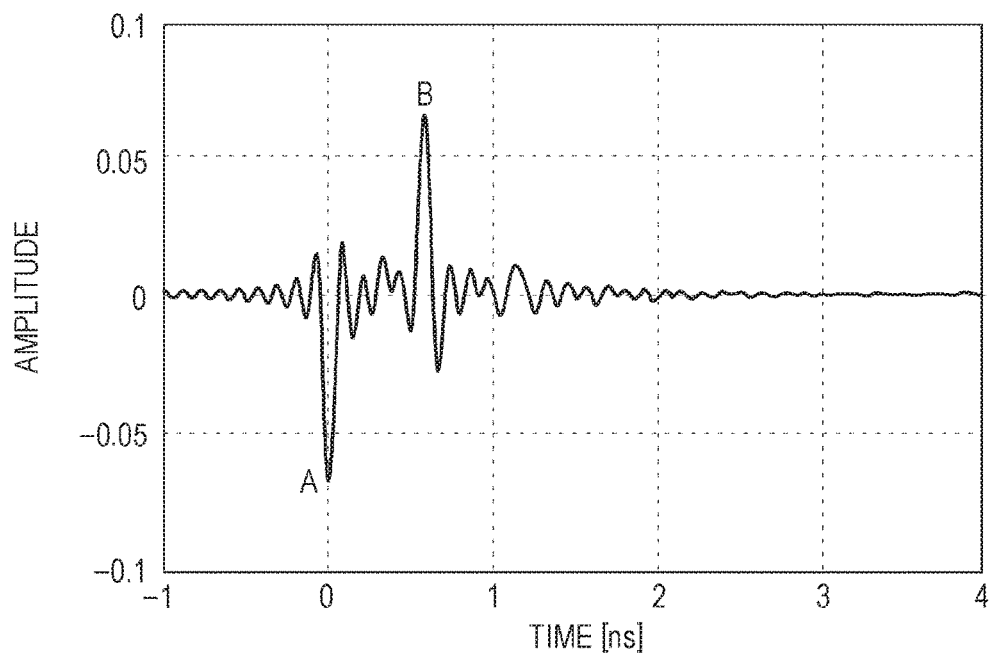
FIG. 10A is a graph illustrating a time-amplitude characteristic in an SHORT condition of termination of the millimeter-wave cable.
Figure 10B:
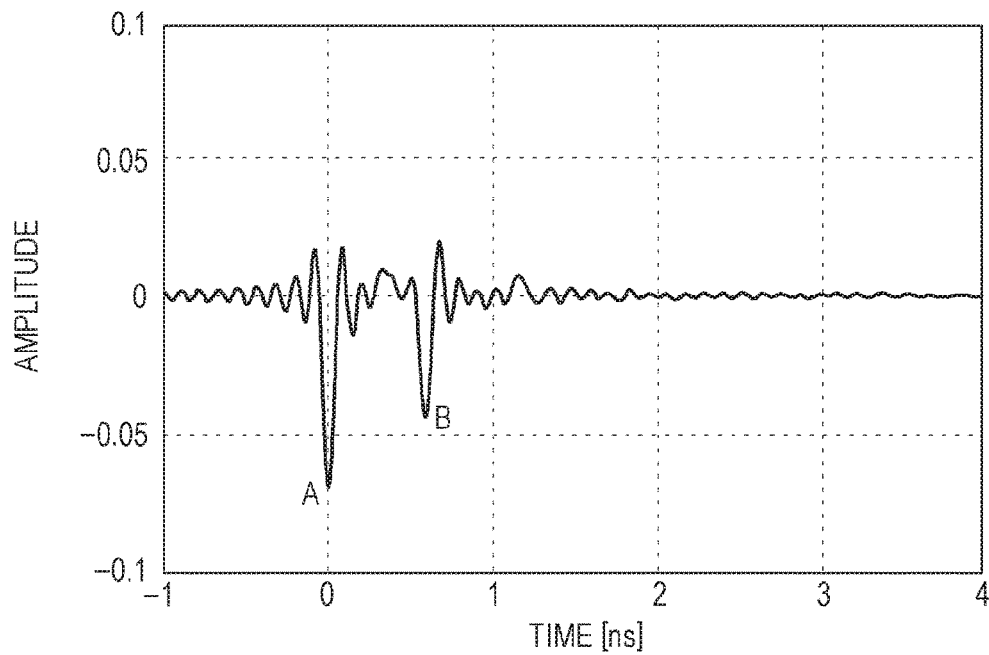
FIG. 10B is a graph illustrating a time-amplitude characteristic in an OPEN condition of the termination of the millimeter-wave cable.

The B component reflected at the termination of the millimeter-wave cable 30 is modulated by changing the termination condition of the millimeter-wave cable 30, i.e., by switching the termination of the millimeter-wave cable 30 to SHORT/OPEN, in the present example. FIG. 10A illustrates a time-amplitude characteristic in a SHORT condition of the termination of a millimeter-wave cable 30, FIG. 10B illustrates a time-amplitude characteristic in an OPEN condition of the termination of the millimeter-wave cable 30. As is apparent from the comparison between FIGS. 10A and 10B, a phase of the B component is inverted by switching the termination of the millimeter-wave cable 30 to SHORT/OPEN. Accordingly, information is carried on the B component, the information is modulated to the millimeter-wave band, and the information can be transmitted using the millimeter-wave cable 30.

[Specific Example of Termination Condition Changer]

Next, a specific example of the termination condition changer 21 used in Examples 1 to 6 will be described, which changes the termination condition of the millimeter-wave cable 30.

Figure 11A:
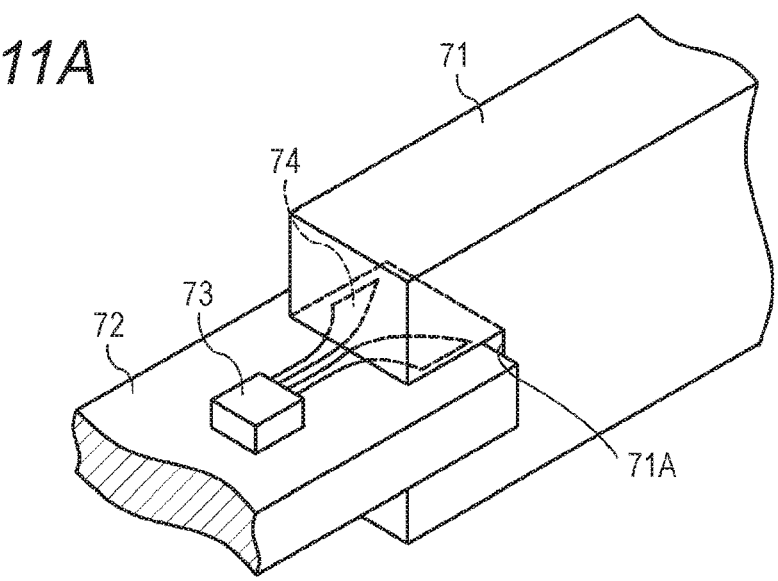
FIG. 11A is a perspective view illustrating a connection portion between the termination of the millimeter-wave cable and a termination condition changer.
Figure 11B:
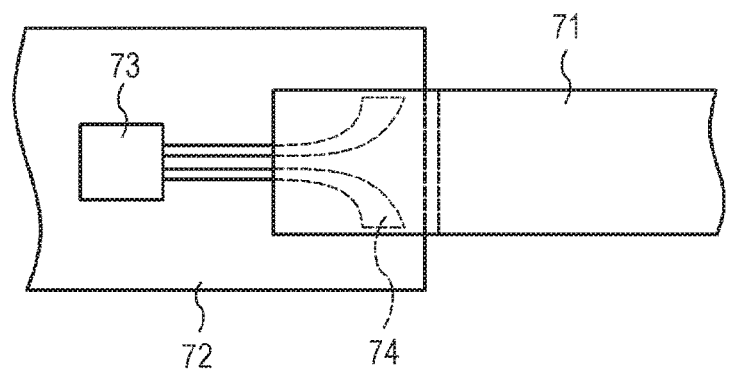
FIG. 11B is a plan view illustrating the connection portion.
Figure 11C:
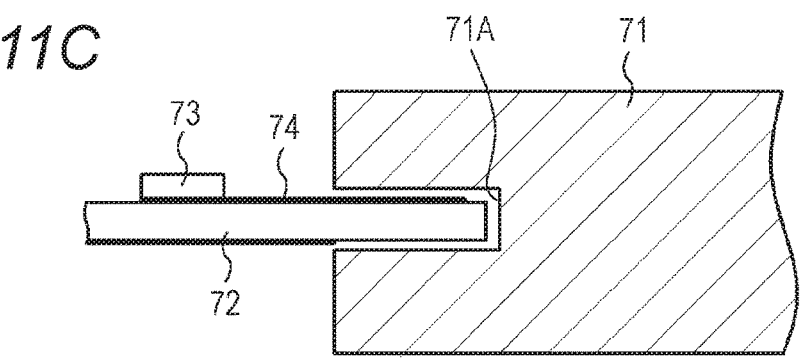
FIG. 11C is a side view illustrating the connection portion, partially including a cross-section.

FIG. 11A is a perspective view illustrating a connection portion between the termination of the millimeter-wave cable 30 and the termination condition changer 21, FIG. 11B is a plan view illustrating the connection portion, and FIG. 11C is a side view illustrating the connection portion, partially including a cross-section. In the present specific example, as an example, the millimeter-wave cable 30 uses a waveguide 71 filled with a dielectric material. In the waveguide 71 filled with the dielectric material, an electromagnetic wave propagates in the dielectric material, while forming the electromagnetic field according to a wavelength (frequency) or the like.

The waveguide 71, as the millimeter-wave cable 30, is filled with the dielectric material. A notched portion 71A is formed at an end of the waveguide 71. A printed circuit board 72 has an end fitted into the notched portion 71A. A CMOS chip 73 internally has the termination condition changer 21, and the CMOS chip 73 is mounted on the printed circuit board 72. Further, an antenna pattern 74 is formed on a surface at the end of the printed circuit board 72. The antenna pattern 74 is electrically connected to the CMOS chip 73, and performs signal transmission with the waveguide 71 filled with the dielectric material, using electromagnetic induction.

In the configuration described above, the signal (i.e., the millimeter-wave reference signal) propagated by the waveguide 71 filled with the dielectric material is transmitted to the CMOS chip 73, through the antenna pattern 74 on the printed circuit board 72. The CMOS chip 73, specifically, the termination condition changer 21 included in the CMOS chip 73 is defined as the termination.

Figure 12:
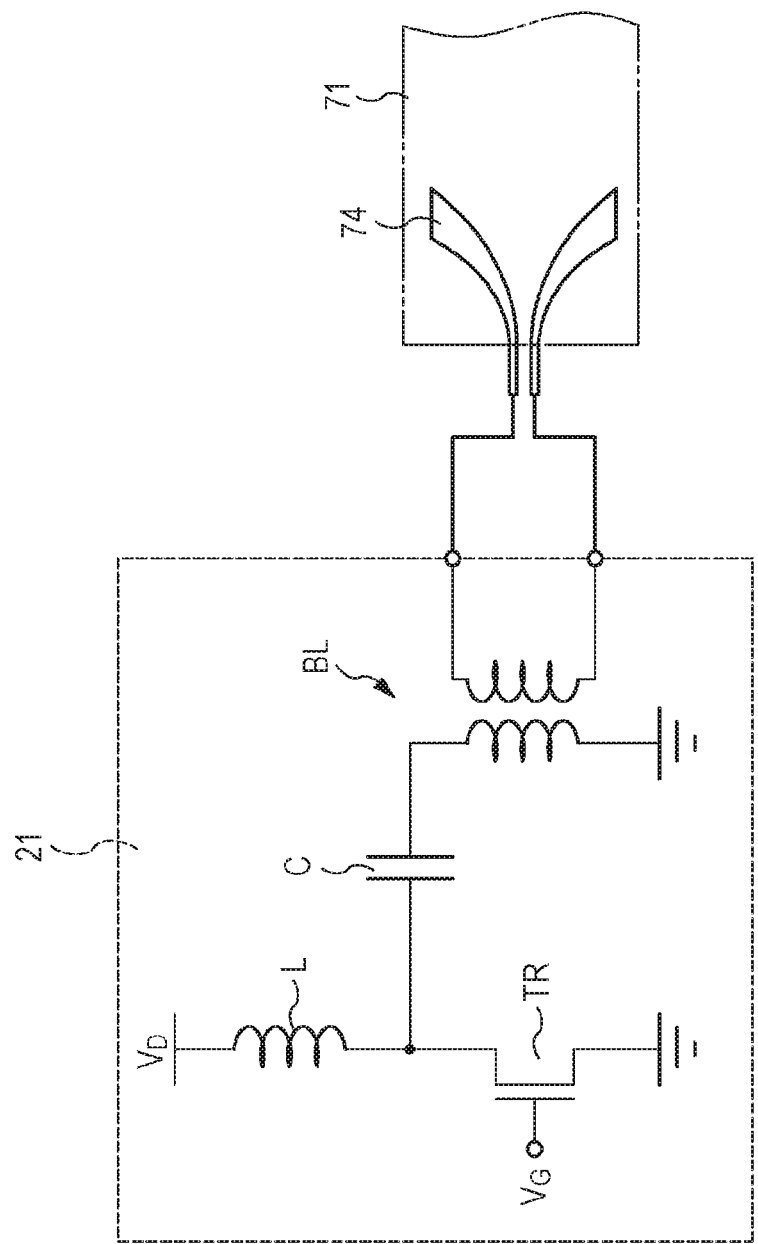
FIG. 12 is a circuit diagram illustrating an exemplary circuit configuration of the termination condition changer, including a termination structure of the millimeter-wave cable.

FIG. 12 illustrates an exemplary circuit configuration of the termination condition changer 21, including a termination structure of the millimeter-wave cable 30.

The termination condition changer 21 includes a switching transistor (FET) TR. The switching transistor TR has a source electrode being grounded, and a drain electrode connected to a power source $V_D$ through an inductor L. A balun BL is connected, through a capacitor C, to the drain electrode of the switching transistor TR.

In the configuration described above, from the antenna pattern 74 on the printed circuit board 72, the millimeter-wave reference signal propagated by the waveguide 71 filled with the dielectric material is output as differential signals. The differential signals are converted to a single-ended signal in the balun BL, and the single-ended signal is supplied to the drain electrode of the switching transistor TR through the capacitor C. The switching transistor TR modulates the millimeter-wave reference signal provided through the balun BL and the capacitor C by modulation of gate voltage $V_G$ with the transmission data. The modulated millimeter-wave reference signal is transmitted to the antenna pattern 74 through the capacitor C and the balun BL, and transmitted to the waveguide 71 filled with a dielectric material, using electromagnetic induction.

It is noted that the present disclosure may be configured as follows.

[A01] <<Receiving Circuit>>

A receiving circuit including a reference signal generation unit configured to generate a high-frequency reference signal, and transmit the reference signal to a transmitting circuit through a signal transmission path configured to trap and transmit a radio wave in the transmission path, and a transmission data restoration unit configured to receive the reference signal modulated based on transmission data in the transmitting circuit and returned through the signal transmission path, and restore the transmission data.

[A02] The receiving circuit according to [A01], further including a signal separation unit configured to separate a reference signal returned from the transmitting circuit, from a reference signal transmitted to the transmitting circuit.

[A03] The receiving circuit according to [A02], in which the signal separation unit temporally separates the reference signal transmitted to the transmitting circuit and the reference signal returned from the transmitting circuit.

[A04] The receiving circuit according to [A03], in which the reference signal generation unit transmits the next reference signal, after receiving the reference signal returned from the transmitting circuit.

[A05] The receiving circuit according to [A03], in which the reference signal generation unit transmits the reference signal at a periodic interval not overlapping the reference signal returned from the transmitting circuit.

[A06] The receiving circuit according to [A03], in which the reference signal generation unit transmits, to the transmitting circuit, the reference signals as a continuous signal.

[A07] The receiving circuit according to any of [A01] to [A06], in which the receiving circuit receives the reference signal modulated by changing a termination condition of the signal transmission path based on the transmission data in the transmitting circuit, and returned through the signal transmission path.

[A08] The receiving circuit according to any of [A01] to [A07], in which the high-frequency reference signal is a millimeter-wave band signal.

[A09] The receiving circuit according to any of [A01] to [A08], in which the signal transmission path includes a waveguide.

[A10] The receiving circuit according to any of [A01] to [A09], in which the signal transmission path has a fixed length.

[B01] <<Transmitting Circuit>>

A transmitting circuit including a modulation unit configured to modulate, based on transmission data, a high-frequency reference signal transmitted from a receiving circuit through a signal transmission path configured to trap and transmit a radio wave in the transmission path, and return the reference signal to the receiving circuit through the signal transmission path.

[B02]

The transmitting circuit according to [B01], in which the transmitting circuit modulates, based on the transmission data restored in the receiving circuit, the reference signal transmitted from the receiving circuit through the signal transmission path, and transmits the reference signal to the receiving circuit through the signal transmission path.

[B03] The transmitting circuit according to [B01] or [B02], in which the modulation unit changes a termination condition of the signal transmission path based on the transmission data to modulate the reference signal.

[B04] The transmitting circuit according to any of [B01] to [B03], in which the high-frequency reference signal is a millimeter-wave band signal.

[B05] The transmitting circuit according to any of [B01] to [B04], in which the signal transmission path includes a waveguide.

[B06] The transmitting circuit according to any of [B01] to [B05], in which the signal transmission path has a fixed length.

[C01] <<Communication System>>

A communication system including a transmitting circuit configured to transmit transmission data, a receiving circuit configured to generate a high-frequency reference signal, and a signal transmission path positioned between the transmitting circuit and the receiving circuit trapping and transmitting a radio wave in the transmission path, the transmitting circuit modulating, based on the transmission data, the reference signal transmitted from the receiving circuit through the signal transmission path, and returning the reference signal to the receiving circuit through the signal transmission path, the receiving circuit receiving the reference signal returned from the transmitting circuit through the signal transmission path, and restoring the transmission data.

[C02] The communication system according to [C01], in which the transmitting circuit includes a modulation unit configured to modulate, based on the transmission data, the high-frequency reference signal transmitted from the receiving circuit through the signal transmission path.

[C03] The communication system according to [C02], in which the modulation unit changes a termination condition of the signal transmission path based on the transmission data to modulate the reference signal.

[C04] The communication system according to any of [C01] to [C03], in which the high-frequency reference signal is a millimeter-wave band signal.

[C05] The communication system according to any of [C01] to [C04], in which the signal transmission path includes a waveguide.

[C06] The communication system according to any of [C01] to [C05], in which the signal transmission path has a fixed length.

[C07] The communication system according to any of [C01] to [C06], in which the receiving circuit includes a reference signal generation unit configured to generate the high-frequency reference signal, and transmit the reference signal to the transmitting circuit through the signal transmission path, and a transmission data restoration unit configured to receive the reference signal returned from the transmitting circuit through the signal transmission path, and restore the transmission data.

[C08] The communication system according to any of [C01] to [C07], in which the receiving circuit includes a signal separation unit configured to separate the reference signal returned from the transmitting circuit, from the reference signal transmitted to the transmitting circuit.

[C09] The communication system according to [C08], in which the signal separation unit temporally separates the reference signal transmitted to the transmitting circuit and the reference signal returned from the transmitting circuit.

[C10] The communication system according to [C09], in which the reference signal generation unit transmits the next reference signal, after receiving the reference signal returned from the transmitting circuit.

[C11] The communication system according to [C09], in which the reference signal generation unit transmits the reference signal at a periodic interval not overlapping the reference signal returned from the transmitting circuit.

[C12] The communication system according to [C09], in which the reference signal generation unit transmits, to the transmitting circuit, the reference signals as a continuous signal.

[D01] <<Communication Method>>

A communication method including transmitting a high-frequency reference signal generated in a receiving circuit to a transmitting circuit, through a signal transmission path configured to trap and transmit a radio wave in the transmission path, modulating, based on transmission data, the reference signal transmitted from the receiving circuit through the signal transmission path to return the reference signal to the receiving circuit through the signal transmission path, and receiving the reference signal returned from the transmitting circuit through the signal transmission path to restore the transmission data.

[D02] The communication method according to [D01], in which the transmitting circuit includes a modulation unit configured to modulate the high-frequency reference signal transmitted from the receiving circuit through the signal transmission path, based on the transmission data generated in a transmission data generation unit.

[D03] The communication system according to [D02], in which the modulation unit changes a termination condition of the signal transmission path based on the transmission data to modulate the reference signal.

[D04] The communication method according to any of [D01] to [D03], in which the high-frequency reference signal is a millimeter-wave band signal.

[D05] The communication method according to any of [D01] to [D04], in which the signal transmission path includes a waveguide.

[D06] The communication method according to any of [D01] to [D05], in which the signal transmission path has a fixed length.

[D07] The communication method according to any of [D01] to [D06], in which the receiving circuit includes a reference signal generation unit configured to generate the high-frequency reference signal, and transmit the reference signal to the transmitting circuit through the signal transmission path, and a transmission data restoration unit configured to receive the reference signal returned from the transmitting circuit through the signal transmission path, and restore the transmission data.

[D08] The communication method according to any of [D01] to [D07], in which the receiving circuit includes a signal separation unit configured to separate the reference signal returned from the transmitting circuit from the reference signal transmitted to the transmitting circuit.

[D09] The communication method according to [D08], in which the signal separation unit temporally separates the reference signal transmitted to the transmitting circuit and the reference signal returned from the transmitting circuit.

[D10] The communication method according to [D09], in which the reference signal generation unit transmits the next reference signal, after receiving the reference signal returned from the transmitting circuit.

[D11] The communication method according to [D09], in which the reference signal generation unit transmits the reference signal at a periodic interval not overlapping the reference signal returned from the transmitting circuit.

[D12] The communication method according to [D09], in which the reference signal generation unit transmits, to the transmitting circuit, the reference signals as a continuous signal.

REFERENCE SIGNS LIST

1 Communication system
10 Receiving circuit (receiving circuit for load modulation)
11 Millimeter-wave reference signal generation unit
12 Signal separation unit
13 Reflected-signal extraction unit
14 Multiplier
15 Phase adjustment unit
16 Low-pass filter (LPF)
17 Difference extraction unit
20 Transmitting circuit (transmitting circuit for load modulation)
21 Termination condition changer
30 Signal transmission path (millimeter-wave cable)
40 Millimeter wave transmitting circuit
41 BPSK modulation unit
50 Millimeter-wave reception circuit
51 BPSK demodulation unit
52 Wave detection unit
53 Reference-signal clock regeneration unit
61 Signal generation/measurement device
62 Coaxial cable
63 Coaxial waveguide
64 Waveguide adapter
71 Waveguide filled with dielectric material
72 Printed circuit board
73 CMOS chip
74 Antenna pattern
100 First communication device
200 Second communication device
BL Balun
C Capacitor
L Inductor

What is claimed is:

1. A receiving circuit comprising:
a reference signal generation unit included in the receiving circuit configured to generate a high-frequency reference signal, and transmit the reference signal to a transmitting circuit through a signal transmission path configured to trap and transmit a radio wave in the transmission path, wherein the transmitting circuit forms a modulated reference signal by modulating the reference signal provided by the reference signal generation unit and received at the transmitting circuit using transmission data; and
a transmission data restoration unit included in the receiving circuit configured to receive the modulated reference signal returned by the transmitting circuit to the receiving circuit through the signal transmission path, and further configured to restore the transmission data.

2. The receiving circuit according to claim 1, further comprising a signal separation unit configured to separate the reference signal returned from the transmitting circuit from the reference signal transmitted to the transmitting circuit, and wherein the transmission data includes an image signal.

3. The receiving circuit according to claim 2, wherein the signal separation unit temporally separates the reference signal transmitted to the transmitting circuit and the reference signal returned from the transmitting circuit.

4. The receiving circuit according to claim 3, wherein the reference signal generation unit transmits the next reference signal, after receiving the reference signal returned from the transmitting circuit.

5. The receiving circuit according to claim 3, wherein the reference signal generation unit transmits the reference signal at a periodic interval not overlapping the reference signal returned from the transmitting circuit.

6. The receiving circuit according to claim 3, wherein the reference signal generation unit transmits, to the transmitting circuit, the reference signals as a continuous signal.

7. The receiving circuit according to claim 1, wherein the receiving circuit receives the reference signal modulated by changing a termination condition of the signal transmission path based on the transmission data in the transmitting circuit, and returned through the signal transmission path.

8. The receiving circuit according to claim 1, wherein the high-frequency reference signal is a millimeter-wave band signal that has a wavelength between 1 mm and 10 mm, which corresponds to a frequency between about 30 GHz and about 300 GHz.

9. The receiving circuit according to claim 1, wherein the signal transmission path includes a waveguide.

10. The receiving circuit according to claim 1, wherein the signal transmission path has a fixed length.

11. A transmitting circuit comprising
a modulation unit including a termination condition changer configured to modulate, based on transmission data, a high-frequency reference signal transmitted from a receiving circuit and received by the transmitting circuit through a signal transmission path configured to trap and transmit the high-frequency reference signal, and wherein the modulation unit of the transmitting circuit returns a modulated reference signal containing the transmission data to the receiving circuit through the signal transmission path.

12. The transmitting circuit according to claim 11, wherein the transmitting circuit modulates, based on the transmission data restored in the receiving circuit, the reference signal transmitted from the receiving circuit through the signal transmission path, and transmits the reference signal to the receiving circuit through the signal transmission path.

13. The transmitting circuit according to claim 11, wherein the modulation unit changes a termination condition of the signal transmission path based on the transmission data to modulate the reference signal.

14. The transmitting circuit according to claim 11, wherein the high-frequency reference signal is a millimeter-wave band signal that has a wavelength between 1 mm and 10 mm, which corresponds to a frequency between about 30 GHz and about 300 GHz.

15. The transmitting circuit according to claim 11, wherein the signal transmission path includes a waveguide.

16. The transmitting circuit according to claim 11, wherein the signal transmission path has a fixed length.

17. A communication system comprising:
a transmitting circuit configured to transmit transmission data;
a receiving circuit configured to generate a high-frequency reference signal; and
a signal transmission path positioned between the transmitting circuit and the receiving circuit trapping and transmitting a radio wave in the transmission path,
the transmitting circuit modulating, based on the transmission data, the reference signal transmitted from the receiving circuit through the signal transmission path and received by the transmitting circuit to form a modulated reference signal, and returning the modulated reference signal to the receiving circuit through the signal transmission path, the receiving circuit receiving the modulated reference signal returned from the transmitting circuit through the signal transmission path, and restoring the transmission data.

18. The communication system according to claim 17, wherein the high-frequency reference signal is a millimeter-wave band signal that has a wavelength between 1 mm and 10 mm, which corresponds to a frequency between about 30 GHz and about 300 GHz.

19. A communication method comprising:
transmitting a high-frequency reference signal generated in a receiving circuit to a transmitting circuit through a signal transmission path configured to trap and transmit a radio wave in the transmission path;
modulating, based on transmission data, the reference signal transmitted from the receiving circuit through the signal transmission path in the transmitting circuit and returning a modulated reference signal to the receiving circuit through the signal transmission path; and
receiving the modulated reference signal returned from the transmitting circuit through the signal transmission path at a reflected signal extraction unit of the receiving circuit, wherein the transmission data is restored at the receiving circuit.

20. The communication method according to claim 19, wherein the high-frequency reference signal is a millimeter-wave band signal that has a wavelength between 1 mm and 10 mm, which corresponds to a frequency between about 30 GHz and about 300 GHz.

* * * * *